United States Patent
Vincent et al.

(10) Patent No.: US 10,320,844 B2
(45) Date of Patent: Jun. 11, 2019

(54) RESTRICTING ACCESS TO PUBLIC CLOUD SAAS APPLICATIONS TO A SINGLE ORGANIZATION

(71) Applicant: Microsoft Technology Licensing, LLC, Redmond, WA (US)

(72) Inventors: Benjamin Richard Vincent, Kirkland, WA (US); Ross Peter Adams, Redmond, WA (US); Ariel Gordon, Kirkland, WA (US); Konstantin Ryvkin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 192 days.

(21) Appl. No.: 14/995,004

(22) Filed: Jan. 13, 2016

(65) Prior Publication Data

US 2017/0201549 A1 Jul. 13, 2017

(51) Int. Cl.
  *G06F 17/00* (2019.01)
  *H04L 29/06* (2006.01)
  *H04L 29/08* (2006.01)

(52) U.S. Cl.
  CPC ............ *H04L 63/20* (2013.01); *H04L 63/10* (2013.01); *H04L 67/1097* (2013.01)

(58) Field of Classification Search
  CPC ............ G06F 21/554; G06F 21/6218; H04L 63/0428; H04L 63/20; H04L 67/10
  USPC ....................................... 726/1, 27
  See application file for complete search history.

(56) References Cited

U.S. PATENT DOCUMENTS

| | | | |
|---|---|---|---|
| 8,819,801 B2 | 8/2014 | Sangubhatla et al. | |
| 8,972,490 B1* | 3/2015 | Todd ................... | G06F 16/9535 709/203 |
| 9,087,322 B1 | 7/2015 | Graham et al. | |
| 9,424,429 B1* | 8/2016 | Roth ....................... | G06F 21/45 |
| 2003/0070141 A1* | 4/2003 | Zeggert ................ | G06F 16/258 715/228 |
| 2010/0286992 A1* | 11/2010 | Tkatch ................... | G06Q 30/00 705/1.1 |
| 2011/0110377 A1 | 5/2011 | Alkhatib et al. | |

(Continued)

FOREIGN PATENT DOCUMENTS

| | | |
|---|---|---|
| CN | 103051631 A | 4/2013 |
| CN | 103747076 A | 4/2014 |

OTHER PUBLICATIONS

Xiong, et al., "PRIAM: Privacy Preserving Identity and Access Management Scheme in Cloud", In Journal of KSII Transactions on Internet and Information Systems, vol. 8, Issue 1, Jan. 30, 2014, 24 pages.

(Continued)

*Primary Examiner* — Gary S Gracia
(74) *Attorney, Agent, or Firm* — Workman Nydegger

(57) ABSTRACT

Allowing an entity managed device to access a tenant associated with the e on a public cloud service while preventing the device from accessing one or more other tenants on the cloud service. A method includes, at the cloud service, obtaining policy from the entity with respect to tenant access. The method further includes, at the cloud service, receiving a request from the entity managed device to access a tenant at the cloud service. The method further includes granting or denying the access request based on the policy obtained from the entity.

18 Claims, 4 Drawing Sheets

(56) References Cited

U.S. PATENT DOCUMENTS

| | | | |
|---|---|---|---|
| 2011/0119481 A1* | 5/2011 | Auradkar | G06F 21/6209 713/150 |
| 2011/0270932 A1* | 11/2011 | Chaturvedi | H04L 45/12 709/206 |
| 2012/0096271 A1* | 4/2012 | Ramarathinam | H04L 63/0807 713/172 |
| 2012/0239792 A1* | 9/2012 | Banerjee | H04L 67/1097 709/223 |
| 2013/0024919 A1 | 1/2013 | Weller et al. | |
| 2013/0061306 A1 | 3/2013 | Sinn | |
| 2013/0167253 A1* | 6/2013 | Seleznev | G06F 21/10 726/29 |
| 2013/0282890 A1* | 10/2013 | Ma | H04L 43/12 709/224 |
| 2013/0305326 A1* | 11/2013 | Potiagalov | H04L 69/08 726/5 |
| 2013/0311986 A1* | 11/2013 | Arrouye | G06F 8/61 717/175 |
| 2014/0013409 A1 | 1/2014 | Halageri | |
| 2014/0020073 A1 | 1/2014 | Ronda et al. | |
| 2014/0050317 A1 | 2/2014 | Sabin | |
| 2014/0075565 A1* | 3/2014 | Srinivasan | G06Q 10/06315 726/26 |
| 2014/0075568 A1* | 3/2014 | Sathyadevan | G06F 21/6218 726/27 |
| 2014/0096221 A1* | 4/2014 | Wallis | G06F 21/335 726/9 |
| 2014/0181186 A1* | 6/2014 | Stevens | H04L 67/322 709/203 |
| 2014/0259093 A1* | 9/2014 | Narayanaswamy | H04L 67/20 726/1 |
| 2014/0304837 A1* | 10/2014 | Mogaki | G06F 21/33 726/28 |
| 2015/0046971 A1* | 2/2015 | Huh | H04L 9/3213 726/1 |
| 2015/0058749 A1* | 2/2015 | Hwu | H04L 67/18 715/753 |
| 2015/0089569 A1* | 3/2015 | Sondhi | H04L 63/08 726/1 |
| 2015/0127546 A1 | 5/2015 | Saxena et al. | |
| 2015/0135302 A1 | 5/2015 | Cohen et al. | |
| 2015/0180863 A1* | 6/2015 | Kobayashi | H04L 47/70 726/9 |
| 2015/0341340 A1* | 11/2015 | Lu | H04L 9/3263 726/6 |

OTHER PUBLICATIONS

Lau, et al., "Best Practices for Access Control in Multi-Tenant Cloud Solutions Using Tivoli Access Manager", Published on: May 1, 2011 Available at: http://www.ibm.com/developerworks/cloud/library/cl-cloudTAM/.

* cited by examiner

RESTRICTING ACCESS TO PUBLIC CLOUD SAAS APPLICATIONS TO A SINGLE ORGANIZATION

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Public Cloud services are categorized by the fact that these resources are shared across multiple organizations.

Many enterprise customers in highly regulated sectors, such as banking and defense, are blocked from adopting public cloud services such as Office 365, available from Microsoft Corporation, of Redmond, Wash., because these services cannot easily address data exfiltration or rogue trading scenarios. For example, these organizations might have a compliance requirement to prevent their employees from accessing an email account that belongs to another organization, when using a corporate-owned computer or when they are inside of a corporate network. Banks, for example, are concerned that their employees might be able to go to a cloud based webmail, sign out of their corporate account (which is a tenant at the webmail service), sign in again to an account in another tenant of the webmail service, and use this email account to send rogue trading instruction to an accomplice outside of the bank.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for allowing an entity managed device to access a tenant associated with the entity on a public cloud service while preventing the device from accessing one or more other tenants on the cloud service. The method includes, at the cloud service, obtaining policy from the entity with respect to tenant access. The method further includes, at the cloud service, receiving a request from the entity managed device to access a tenant at the cloud service. The method further includes granting or denying the access request based on the policy obtained from the entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
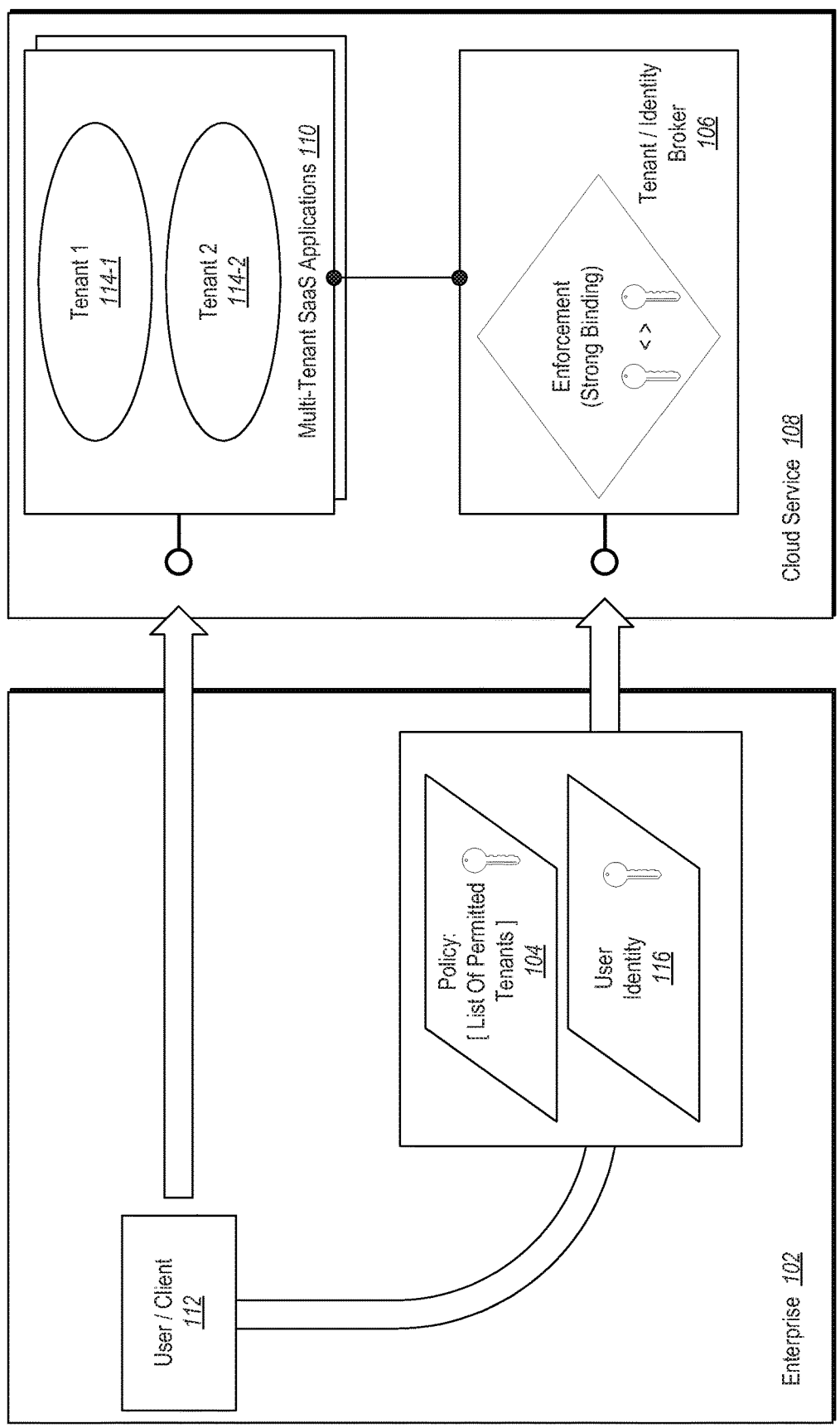
FIG. 1 illustrates an enterprise coupled to a cloud service configured to allow enterprise control of tenant access on the cloud service.

Embodiments described herein illustrate novel solutions to allow organizations to adopt software as a service (SaaS) applications and restrict their employees' access to their only own instances of these applications. For example, as illustrated in FIG. 1, in some embodiments, an enterprise 102 may be able to provide policy 104 to an identity platform 106. The identity platform 106 is associated with a cloud service 108, and in particular, controls access to one or more multi-tenant SaaS applications 110. In particular, the identity platform 106 can restrict enterprise controlled devices from accessing tenants that are not associated with the enterprise 102.

For example, in some embodiments, the identity platform 106 can restrict token issuance to a single tenant of a multi-tenant SaaS application 110. Thus, instead of restricting access to the SaaS applications 110 themselves, embodiments restrict the ability of an identity platform to issue security tokens to a given user's home tenant only. In the example illustrated in FIG. 1, the device 112 is a device having a user/client of the multi-tenant applications 110, and the device 112 is managed by the enterprise 102, where the enterprise 102 is tenant 114-1 for the multi-tenant SaaS applications 110.

Previously, organizations would address issues with users at the organization accessing other external systems by using firewall rules that block top level domains. For example, users would be allowed to access an email server hosted on premises or at a dedicated cloud URL, but would be blocked from accessing other URLs. However, such firewall rules do not work where SaaS applications are hosted in a public cloud and running on a common URL, such as https://mail.office365.com available from Microsoft Corporation of Redmond, Wash. Blocking these URLs would effectively block access to every tenant version of the service, including the organization's.

Embodiments described herein include various ways for allowing enterprise control of devices (e.g., device 112), while still allowing the device to access tenants (e.g., tenant 114-1) on a cloud service (e.g., cloud service 108) associated with an entity or organization (e.g., the enterprise 102) while blocking the devices from accessing other tenants (e.g., tenant 114-2) not associated with the enterprise 102.

One way includes using device registration to establish such restrictions. Devices (such as device 112) typically are registered with an organization (e.g., the enterprise 102) in an identity platform (e.g., the identity platform 106) when they are "joined" to this organization.

In the illustrated example, when an http auth request comes to the identity platform 106 from a device 112 registered in the enterprise 102, the identity platform would be able to issue tokens in the context of this particular enterprise 102, but would not be able to issue tokens for any other organization. Such restriction would be controlled by the enterprise's admin via a policy 104, which would be recorded on the identity platform 106. No policy would need to be set on the device 112 itself. Rather, when the device 112 presents a user identity token 116 (identifying the device 112 as an enterprise controlled device), then the identity platform 106 would only issue tokens to the device 112 that allowed the device to access the tenant 114-1, while not providing any tokens for the device to access other tenants in the multi-tenant applications 110.

Alternatively, embodiments may restrict the ability of the identity platform 106 to issue tokens in other tenants (e.g., tenant 114-2) by filtering the identity platform endpoint, such as either by enforcing an outbound HTTP traffic policy on the corporate network firewall (see e.g., FIG. 2), or on the device itself (See e.g., FIG. 3) (e.g., using group policies or device policies on a firewall).

In particular, the enterprise 102 may provide the policy 104 to the identity platform 106 by injecting the policy 104 into a header of a request from the enterprise managed device 112 to access a tenant at the cloud service 108. The policy may be injected by a proxy. As described below, such proxy may be a network edge proxy or an application on a device itself.

Figure 2:
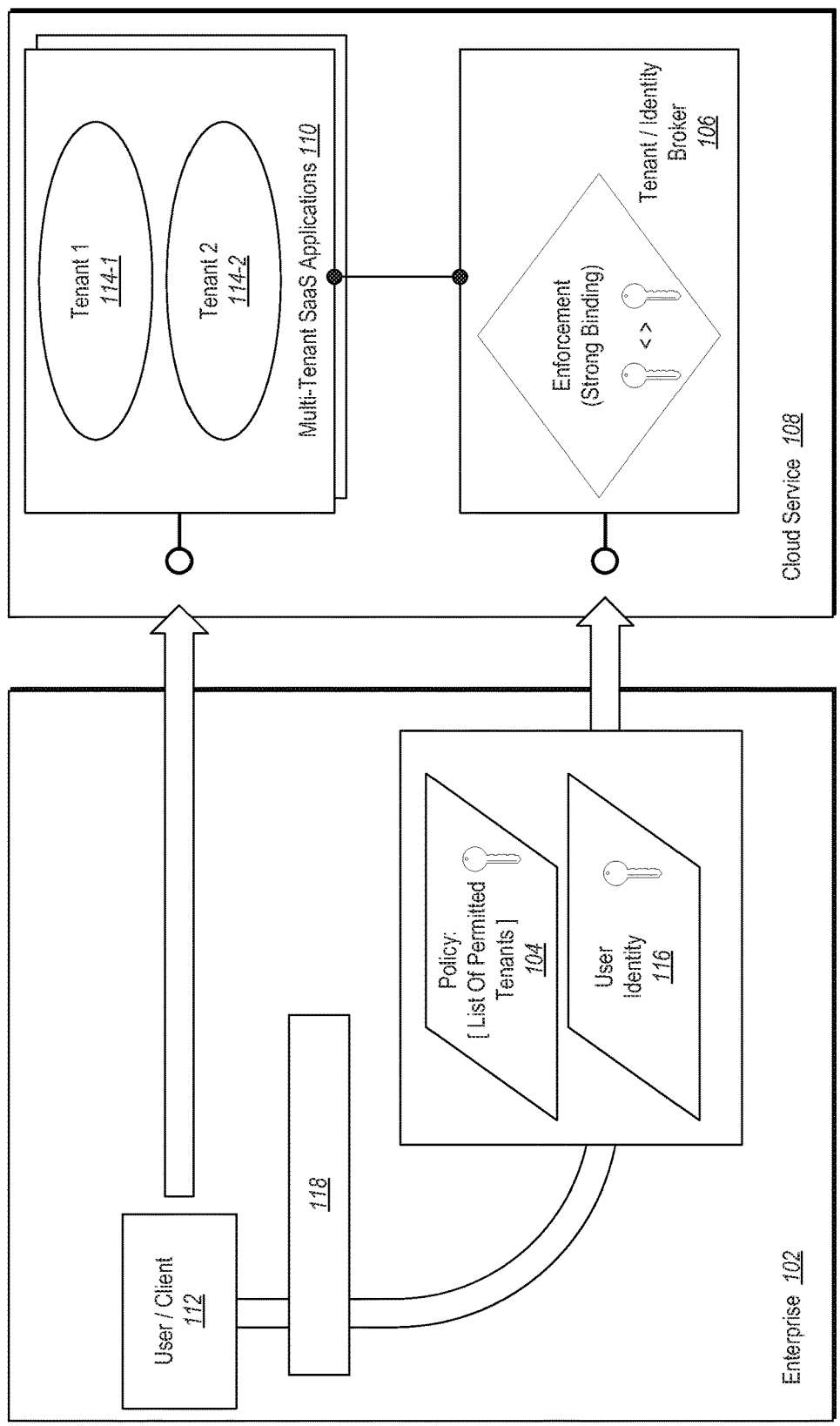
FIG. 2 illustrates an enterprise coupled, through an network edge element, to a cloud service configured to allow enterprise control of tenant access on the cloud service.

For example, as illustrated in FIG. 2, the policy 104 may be injected into the header by a company network edge proxy 118 configured to inject data into headers of network packets. For example, the network edge proxy 118 may determine that a request is directed to the identity platform 106 that gates authentication to the multi-tenant applications 110. The policy 104 is injected into the header of a request from the enterprise managed device 112 to access a tenant at the cloud service 108 only for traffic directed to an authorized endpoint of the identity platform 106.

Figure 3:
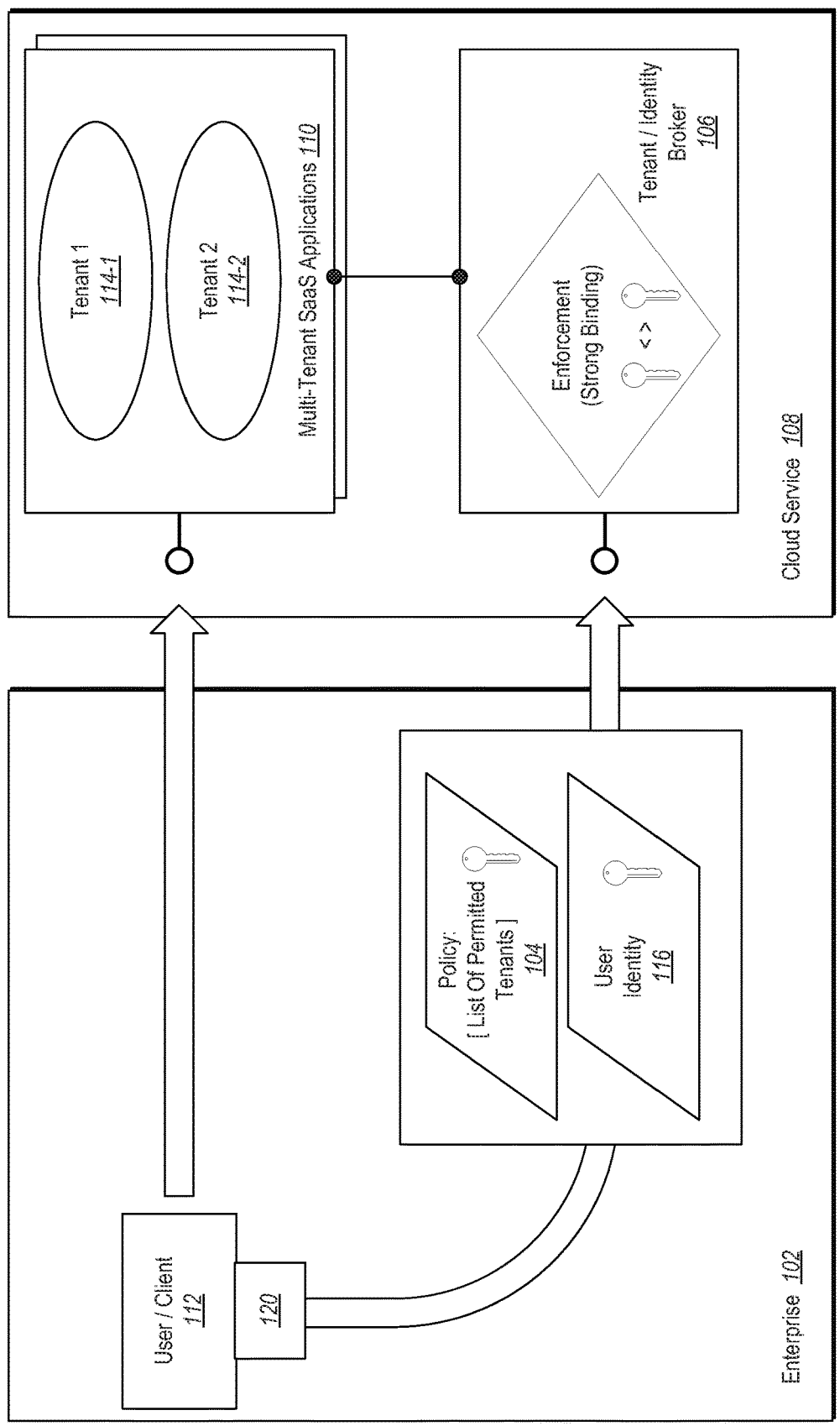
FIG. 3 illustrates an enterprise coupled, through a device element, to a cloud service configured to allow enterprise control of tenant access on the cloud service.

Alternatively, as illustrated in FIG. 3, the policy 104 may be injected into the header by a device element 120 configured to inject data into headers of network packets at the device level.

With the policy injection examples, a user's agent (e.g. a web browser) would be able to navigate to the tenanted endpoint of the identity platform, but not to a common endpoint or to a tenanted endpoint of another organization.

Illustrating now additional details for the various embodiments, in an example, in an Azure AD (available from Microsoft Corporation of Redmond, Wash.), an example might be implemented where policy is sent and/or injected using one or more of the following:

ALLOW https://login.microsoft.com/contoso.com
BLOCK https://login.microsoft.com/*

In both cases, users would be able to navigate to another organization's app, such OWA (for example by going to outlook.com/fabrikam.com or outlook.office.com) but the app would not be able to get a token from the identity platform 106.

In the example illustrated in FIG. 1, the identity platform would only issue tokens for the tenant 114-1 to which the device is registered.

In the examples illustrated in FIGS. 2 and 3, the identity platform 106 would only issue tokens for the tenant 114-1 that matches the firewall restrictions.

Thus, embodiments may use a web proxy, such as a web proxy device on an enterprise network, or a proxy application on devices used with the enterprise network, to insert a custom HTTP header, to "signal" the list of allowed tenants to the identity platform 106. When the identity platform 106 finds the special header, it will only issue service tokens for the allowed tenant(s). Users cannot access public cloud resources without valid tokens issued by the identity platform 106.

Note that the identity platform 106 may be configured to restrict token issuance based on the resource tenant, i.e., the tenant that contains the resource for which the user is requesting a token. This can be used for controlling inter-organizational sharing scenarios by the proxy inserting additional information in a header identifying other tenants that can provide resources to a user. For example, suppose Contoso has a business relationship with Fabrikam and requires access to shared Fabrikam resources, in addition to Contoso resources. If user joe@contoso.com tries to access a resource in the fabrikam.com tenant, then fabrikam.com needs to be present in the inserted header, in addition to contoso.com.

The example illustrated in FIG. 1 may be implemented to work from any network and any device, as long as the device is registered with the enterprise 102 and known to the identity platform 106. Such embodiments can be implemented with imposing any restriction on URLs that are used by the identity platform 106. And, as illustrated above, this can be implemented without requiring embodiments to load any policy onto the device 112 itself.

In the examples illustrated in FIGS. 2 and 3, embodiments may be restricted by firewall restrictions. For example, an implementation at the corpnet firewall level would only be efficient for devices that are inside corpnet.

Any of the embodiments illustrated above can be implemented to function with any SaaS application that is configured to trust the identity platform that implements the restrictions, such as Azure Active Directory available from Microsoft Corporation of Redmond, Wash.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
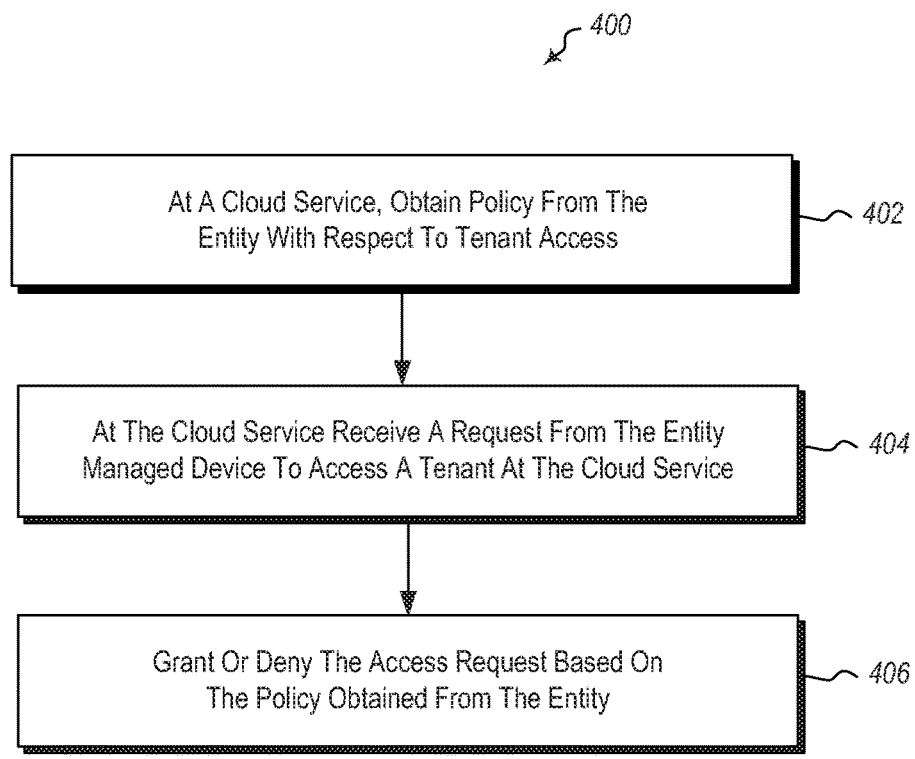
FIG. 4 illustrates a method of allowing an entity managed device to access a tenant associated with the entity on a cloud service while preventing the device from accessing one or more other tenants on the cloud service.

Referring now to FIG. 4, a method. 400 is illustrated. The method 400 may be practiced in a computing environment. The method includes acts for allowing an entity managed device to access a tenant associated with the entity on a cloud service while preventing the device from accessing one or more other tenants on the cloud service. The method 400 includes, at the cloud service, obtaining policy from the entity with respect to tenant access (act 402).

The method further includes at the cloud service, receiving a request from the entity managed device to access a tenant at the cloud service (act 404).

The method farther includes granting or denying the access request based on the policy obtained from the entity (act 406).

For example, in one embodiment of the method 400, the method 400 is practiced where granting or denying the access comprises either issuing or preventing issuance of tokens to devices requesting access to tenants at the cloud service.

In one embodiment of the method 400, the method 400 is practiced where the policy specifies URL filtering conditions identifying at least one of allowed tenants or denied tenants.

In one embodiment of the method 400, the method 400 is practiced where obtaining policy from the entity comprises obtaining policy injected into a header of the request from the entity managed device to access a tenant at the cloud service. For example, the policy may be injected into the header by a network edge element configured to inject data into headers of network packets as illustrated in FIG. 2 above. In some embodiments of this example. The method 400 may further include at the network edge, determining that a request is directed to an identity platform that gates authentication to the cloud applications. Such embodiments may be practiced where policy is injected into the header of the request from the entity managed device to access a tenant at the cloud service only for traffic directed to an authorized endpoint of the identity platform. In particular, is can be expensive to inject header information into network traffic. Thus, in some embodiments, the header information is only injected when the network traffic is directed to an authorized endpoint of an identity platform (such as the identity platform 106).

In an alternative embodiment as illustrated in FIG. 3, the policy may be injected into the header by a device element configured to inject data into headers of network packets at the device level.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a computer system comprising:
   one or more processors; and
   one or more computer-readable media having stored thereon instructions that are executable by the one or more processors to configure the computer system to allow an enterprise device managed by an enterprise to access a tenant that is associated with the enterprise and that is a part of a cloud service while preventing the enterprise device from accessing one or more other tenants that are also parts of the cloud service by causing the computer system to perform at least the following:
   at the cloud service, which is managed by the computer system, receiving an access request that originated from the enterprise device, the access request including both (1) a request from the enterprise device to access the enterprise's associated tenant and (2) policy that, when implemented by the cloud service, controls how the cloud service is to subsequently issue an authentication token such that the request and the policy are included in the access request prior to issuance of the authentication token, wherein the policy includes one or more uniform resource locators (URLs) that collectively identifies at least one or more allowed tenant that the enterprise device is permitted to navigate to or one or more tenant that the enterprise device is not permitted to navigate to;
   at the cloud service, determining that the policy corresponds to access permissions for the enterprise's associated tenant, the policy being received from the enterprise for enforcement by the cloud service, wherein the policy included in the access request provides an indication to the cloud service whether the access request is to be granted by issuing the authentication token or denied by refraining from issuing the authentication token; and
   at the cloud service, granting or denying the access request based on the policy which was obtained from the enterprise and which was included in the access request, wherein any URL in the policy that identifies an allowed tenant causes issuance of the authorization token for the allowed tenant and any URL in the policy that identifies a tenant that the enterprise device is not permitted to navigate to is used to prevent the issuance of the authentication token for the tenant that the enterprise device is not permitted to navigate to.

2. The system of claim 1, wherein the access request is denied and the cloud service refrains from issuing the authentication token.

3. The system of claim 1, wherein obtaining policy from the enterprise comprises obtaining policy injected into a header of the request from the enterprise device to access the enterprise's associated tenant at the cloud service.

4. The system of claim 3, wherein the policy was injected into the header by a network edge element configured to inject data into headers of network packets.

5. The system of claim 4, wherein only traffic directed to an authorized endpoint of the enterprise device is gated by the cloud service, the injected policy being usable by the cloud service to determine which endpoints are authorized for the enterprise device.

6. The system of claim 3, wherein the policy was injected into the header by a device element configured to inject data into headers of network packets at a device level.

7. In a computing environment, a method of allowing an enterprise device managed by an enterprise to access content of a tenant that is associated with the enterprise and that is a part of a cloud service while preventing the enterprise device from accessing content of one or more other tenants that are also parts of the cloud service, the method comprising:
   at the cloud service, receiving an access request that originated from the enterprise device, the access request including both (1) a request from the enterprise device to access the enterprise's associated tenant and (2) policy that, when implemented by the cloud service, controls how the cloud service is to subsequently issue an authentication token such that the request and the policy are included in the access request prior to issuance of the authentication token, wherein the policy includes one or more uniform resource locators (URLs) that collectively identifies at least one or more allowed tenant that the enterprise device is permitted to navigate to or one or more tenant that the enterprise device is not permitted to navigate to;
   at the cloud service, determining that the policy corresponds to access permissions for the enterprise's associated tenant, the policy being received from the enterprise for enforcement by the cloud service, wherein the policy included in the access request provides an indication to the cloud service whether the access request is to be granted by issuing the authentication token or denied by refraining from issuing the authentication token; and
   at the cloud service, granting or denying the access request based on the policy which was obtained from the enterprise and which was included in the access request, wherein any URL in the policy that identifies an allowed tenant causes issuance of the authorization token for the allowed tenant and any URL in the policy that identifies a tenant that the enterprise device is not permitted to navigate to is used to prevent the issuance of the authentication token for the tenant that the enterprise device is not permitted to navigate to.

8. The method of claim 7, wherein the access request is granted and the cloud service issues the authentication token.

9. The method of claim 7, wherein obtaining policy from the enterprise comprises obtaining policy injected into a header of the request from the enterprise device to access the enterprise's associated tenant at the cloud service.

10. The method of claim 9, wherein the policy was injected into the header by a network edge element configured to inject data into headers of network packets.

11. The method of claim 10, wherein only traffic directed to an authorized endpoint of the enterprise device is gated by the cloud service, the injected policy being usable by the cloud service to determine which endpoints are authorized for the enterprise device.

12. The method of claim 9, wherein the policy was injected into the header by a device element configured to inject data into headers of network packets at a device level.

13. In a computing environment, a system comprising:
a cloud service, wherein the cloud service comprises:
a plurality of application instances including at least one application instance for a plurality of tenants; and
an identity platform, wherein the identity platform is configured to: receive an access request that originated from an enterprise device managed by an enterprise, the access request including both (1) a request from the enterprise device to access a tenant of the enterprise and (2) policy that, when implemented by the identify platform, controls how the identity platform is to subsequently issue an authentication token such that the request and the policy are included in the access request prior to issuance of the authentication token, wherein the policy includes one or more uniform resource locators (URLs) that collectively identifies at least one or more allowed tenant that the enterprise device is permitted to navigate to or one or more tenant that the enterprise device is not permitted to navigate to;
determine that the policy corresponds to access permissions for the enterprise's associated tenant, the policy being received from the enterprise for enforcement by the identity platform, wherein the policy included in the access request provides an indication to the cloud service whether the access request is to be granted by issuing the authentication token or denied by refraining from issuing the authentication token; and
at the cloud service, grant or deny the access request based on the policy which was obtained from the enterprise and which was included in the access request, wherein any URL in the policy that identifies an allowed tenant causes issuance of the authorization token for the allowed tenant and any URL in the policy that identifies a tenant that the enterprise device is not permitted to navigate to is used to prevent the issuance of the authentication token for the tenant that the enterprise device is not permitted to navigate to.

14. The system of claim 13, wherein obtaining policy from the enterprise comprises obtaining policy injected into a header of the request from the enterprise device to access the enterprise's associated tenant at the cloud service.

15. The system of claim 14, wherein the policy was injected into the header by a network edge element configured to inject data into headers of network packets.

16. The system of claim 14, wherein the policy was injected into the header by a device element configured to inject data into headers of network packets at a device level.

17. The system of claim 1, wherein the policy includes a plurality of uniform resource locators (URLs), including at least a particular URL of tenant that the enterprise device is permitted to navigate to and at least a particular URL of tenant that the enterprise device is not permitted to navigate to.

18. The computer system of claim 1, wherein a header of the access request includes a listing of a plurality of tenant names, and wherein, after the cloud service receives the listing of the plurality of tenant names, the cloud service uses the listing to control inter-organizational sharing in which any named tenant in the listing is identified by the cloud service as having permissions to provide resources to the enterprise device.

* * * * *